United States Patent [19]

St. Hilaire

[11] Patent Number: 5,790,182
[45] Date of Patent: Aug. 4, 1998

[54] SYSTEM AND METHOD FOR PANORAMIC IMAGING USING CONCENTRIC SPHERICAL MIRRORS

[75] Inventor: Pierre St. Hilaire, Belmont, Calif.

[73] Assignee: Interval Research Corp., Palo Alto, Calif.

[21] Appl. No.: 692,385

[22] Filed: Aug. 5, 1996

[51] Int. Cl.$^6$ .............................. H04N 7/18; G02B 17/00
[52] U.S. Cl. ............................................. 348/36; 359/731
[58] Field of Search .................................. 348/36, 37, 38, 348/39; 352/69, 70, 71; 359/725, 726, 727, 728, 729, 730, 731, 732; H04N 7/18

[56] References Cited

U.S. PATENT DOCUMENTS

| | | | |
|---|---|---|---|
| 3,240,113 | 3/1966 | Stechemesser et al. | 88/24 |
| 3,586,428 | 6/1971 | Matalou | 348/36 |
| 4,012,126 | 3/1977 | Rosendahl et al. | 350/198 |
| 4,205,902 | 6/1980 | Shafer | 350/294 |
| 4,226,501 | 10/1980 | Shafer | 350/55 |
| 4,322,741 | 3/1982 | Kawabayashi | 348/38 |
| 4,395,093 | 7/1983 | Rosendahl et al. | 350/441 |
| 4,484,801 | 11/1984 | Cox | 350/441 |
| 5,130,794 | 7/1992 | Ritchey | 348/39 |
| 5,131,023 | 7/1992 | Yasugaki et al. | 378/43 |
| 5,212,588 | 5/1993 | Viswanathan | 359/355 |
| 5,257,139 | 10/1993 | Higuchi | 359/859 |
| 5,291,339 | 3/1994 | Mochimaru et al. | 359/859 |
| 5,444,478 | 8/1995 | Lelong et al. | 348/39 |
| 5,471,346 | 11/1995 | Ames | 359/731 |
| 5,497,188 | 3/1996 | Kaye | 348/36 |

OTHER PUBLICATIONS

Universal Patterns: The Golden Relationship: Art, Math and Nature (J. Baldwin) Reference #: A10989283, Summer 1991, Whole Earth Review, n.71, p. 111.

The Cult Of The Golden Ratio (Mark Gardner) Reference #: A15383297, Skeptical Inquirer, Spring 1994, v.18 n.3 p.243.

The story of e. (the role of the number e in the mathematical understanding of the hyperbola and the logarithmic spiral) (Eli Maor) Reference #: A15542820, The Sciences, Jul.-Aug. 1994, v.34, n.4, p.24.

A question of numbers (integer sequences) (Brian Aayes) Reference #: A18067593, American Scientist, Jan.-Feb. 1996, v.84, n.1, p. 10.

Primary Examiner—Bryan S. Tung
Attorney, Agent, or Firm—Brooks & Kushman P.C.

[57] ABSTRACT

A system and method for wide angle imaging create a high resolution image using a convex primary mirror concentrically positioned relative to a concave secondary mirror and one or more detectors spherically juxtaposed. The radii of the primary and secondary mirrors are related by the square of the "golden ratio" to reduce low order aberrations. A fiber optic faceplate coupled to each detector corrects field curvature of the image which may then be detected with a conventional flat detector, such as a CCD camera.

1 Claim, 2 Drawing Sheets

SYSTEM AND METHOD FOR PANORAMIC IMAGING USING CONCENTRIC SPHERICAL MIRRORS

TECHNICAL FIELD

The present invention relates to a system and method for wide angle, panoramic imaging.

BACKGROUND ART

Panoramic camera and projection systems have been in existence for several decades. The problem of acquiring and displaying panoramic images has been treated extensively over the years and multiple commercial products have been developed based on this concept. Panoramic systems capable of capturing and displaying a 360 degree field of view have applications in entertainment, telepresence (such as virtual reality training scenarios), videoconferencing, and surveillance.

A number of prior art approaches employ complex catadioptric systems with multiple aspherical reflective and refractive optical elements. Examples of such systems may be found with reference to U.S. Pat. Nos. 4,012,126; 4,395,093; and 4,484,801 which include up to twenty-one lens elements in the refracting system, some requiring special glasses, and hyperbolic mirrors in the reflecting system. These imaging systems are typically very expensive to produce due to the large number of custom elements.

A simpler approach to panoramic projection and imaging is described in U.S. Pat. No. 3,240,113. That patent discloses a primary convex mirror formed of a hollow body with an aperture centered about its axis of revolution. The outer surface of the mirror is produced by the rotation of a curved element having its center outside the body axis and intersecting the axis of revolution at an acute angle. A secondary mirror may be a plane, spherical, conical, convex, or revolving mirror which reflects light from the primary mirror toward an objective. This arrangement limits the vertical angle of the 360 degree picture to overcome problems with prior art designs.

Yet another approach to creating a panoramic image is to synthesize frames taken by multiple cameras or by a single camera at successive adjacent intervals. However, a single camera that is scanned introduces undesirable artifacts for moving images while the use of multiple cameras quickly becomes cost prohibitive.

Thus, it is desirable to provide an optical system capable of capturing a wide angle field of view which utilizes relatively few low-cost optical elements while providing a high resolution image.

DISCLOSURE OF THE INVENTION

An object of the present invention is to provide an optical system for capturing a wide angle, panoramic field of view.

A further object of the present invention is to provide a system and method for imaging a wide angle field of view which does not require aspherical lenses or mirrors.

Yet another object of the present invention is to provide a system and method for imaging a wide angle field of view which minimizes spherical aberration, coma, and astigmatism.

A still further object of the present invention is to provide an inexpensive optical system capable of capturing an image spanning a 360 degree field of view.

A still further object of the present invention is to provide a system and method for imaging a wide angle field of view which corrects field curvature induced by utilization of spherical optical elements.

Another object of the present invention is to provide a system and method for imaging a wide angle field of view onto a detector array.

In carrying out the above objects and other objects and features of the present invention, a system for imaging a wide angle field of view includes an annular spheroid having a convex surface for reflecting incident energy radiating from the field of view, the annular spheroid includes an axially extending aperture, an associated center point, and a first radius of curvature extending from the center point to the convex surface. The system also includes a second spheroid having a concave surface for reflecting energy propagating from the annular spheroid toward the center point. The second spheroid is preferably positioned concentrically relative to the annular spheroid and includes a second radius of curvature extending from the center point to the concave surface. At least one detector positioned to receive at least a portion of the energy reflected from the second spheroid is provided for capturing the image.

A method for imaging a wide angle field of view using first and second spherical surfaces is also disclosed. The method includes reflecting light rays emanating from the field of view using the first generally spherical surface such that generally parallel light rays diverge after being reflected and reflecting light rays emanating from the first generally spherical surface using the second generally spherical surface such that generally parallel light rays converge after being reflected to form a generally spherical image of the field of view, and transforming the generally spherical image to a generally planar image.

Preferably, the method also includes detecting the generally planar image by generating electrical signals in response thereto and storing a representation of the generally planar image.

The advantages accruing to the present invention are numerous. For example, the present invention utilizes only spherical elements to provide a high resolution image free from low order aberrations such as spherical aberration, coma, and astigmatism. Because no aspherics are involved, the cost of the system is considerably less than prior art approaches.

The above objects and other objects, features, and advantages of the present invention will be readily appreciated by one of ordinary skill in this art from the following detailed description of the best mode for carrying out the invention when taken in connection with the accompanying drawings.

BEST MODE(S) FOR CARRYING OUT THE INVENTION

Figure 1:
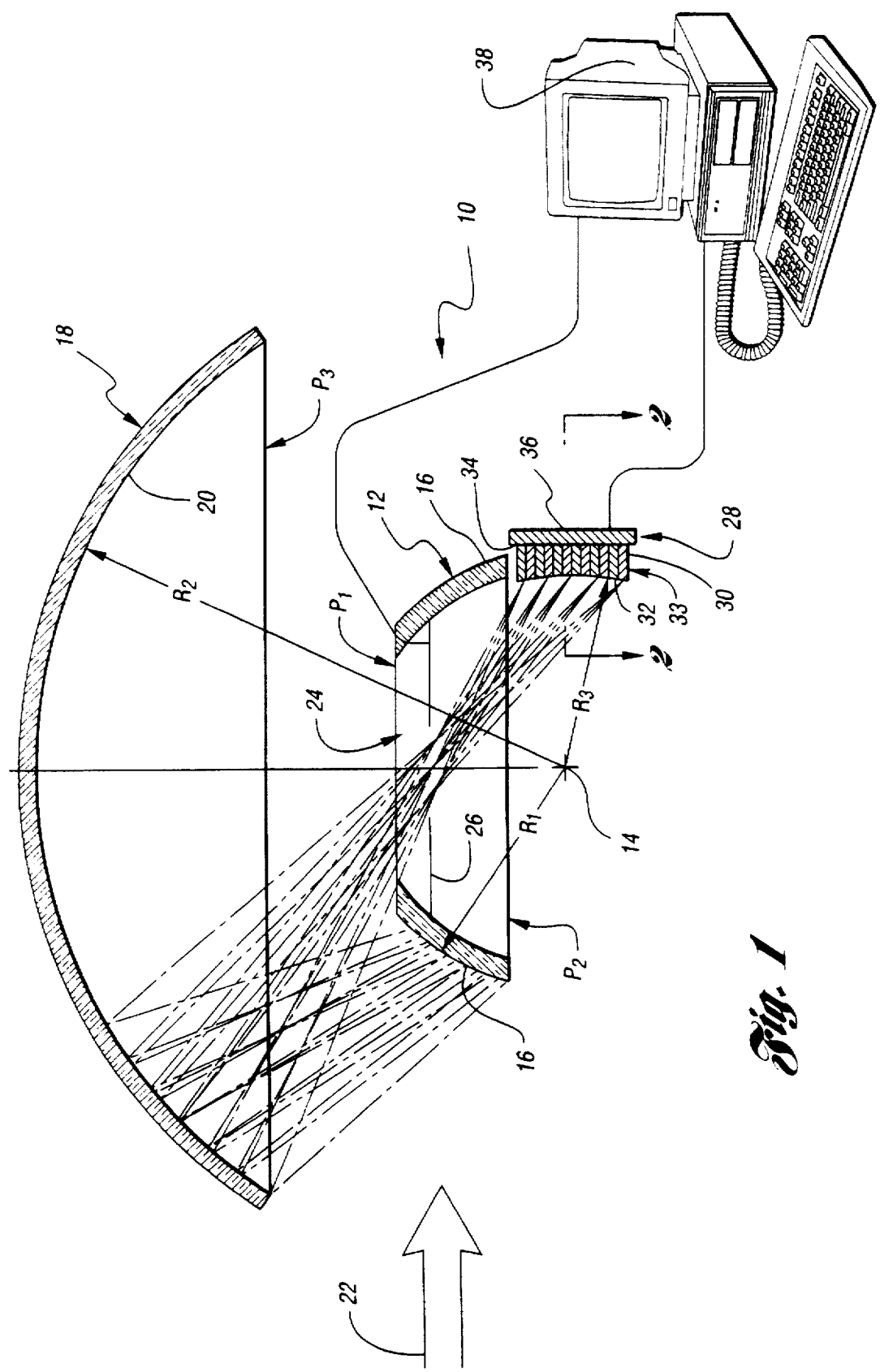
FIG. 1 is a simplified graphical representation of a system and method for imaging a wide angle field of view according to the present invention.

Referring now to FIG. 1, an optical system, indicated generally by reference numeral 10, according to the present invention is shown. The present invention embodied in optical system 10 stems from the well-known concentric Schwarzschild arrangement, named after Karl Schwarzschild, adapted to provide a wide field of view and correct Petzval field curvature. The classic Schwarzschild arrangement is often used in telescopes and microscope objectives, particularly for applications such as X-ray lithography as may be seen by reference to U.S. Pat. Nos. 4,205,902; 4,226,501; 5,131,023; 5,212,588; 5,291,339; and 5,471,346 among others. The classic concentric Schwarzschild arrangement employs a concave mirror having an opening at its center and a convex mirror arranged opposite to the opening of the concave mirror. One disadvantage of this arrangement for telescope applications is the relatively large size required for the concave mirror to achieve sufficient light intensity. The size of the concave mirror in this arrangement is directly related to the size of the aperture which limits the available light and field of view. As such, this arrangement has a limited field of view due to constraints on the size of the concave mirror.

The concentric Schwarzschild arrangement (as compared to the heterocentric arrangement) has concave and convex spherical mirrors concentrically arranged with the radius of curvature of the concave mirror related to the radius of curvature of the convex mirror by the square of the "golden ratio" (about 1.618) which is about 2.6. The golden ratio (phi) is the only positive number which becomes its own reciprocal by subtracting one from it. This ratio is a root of the equation $X^2-X=1$ or $(\sqrt{5}+1)/(\sqrt{5}-1)$ or the limit of the ratio of two adjacent terms of a generalized Fibonacci sequence as the sequence goes to infinity.

Schwarzschild discovered that parallel rays reflected by two spherical surfaces having radii of curvature related by the square of the golden ratio are free from low order aberrations, such as spherical aberration, coma, and astigmatism.

The present invention as embodied in optical system 10 of FIG. 1 capitalizes on Schwarzschild's discovery while providing a unique arrangement of elements to accommodate a wide, panoramic field of view. Optical system 10 includes a primary mirror 12 which is preferably a convex spheroidal frustum having a radius of curvature $R_1$ extending from a center point 14 to reflective surface 16. Primary mirror 12 is bounded by generally parallel planes $P_1$ and $P_2$ which intersect with a generally spherical convex mirror.

Primary mirror 12 is concentrically positioned relative to a secondary mirror 18 which has a radius of curvature $R_2$ extending from center point 14 to reflective surface 20. Secondary mirror 18 is preferably a generally spherical or spheroidal concave mirror extending to an intersection with a plane $P_3$ which is preferably generally parallel to planes $P_1$ and $P_2$. The ratio of the radii of curvature $(R_2/R_1)$ of secondary mirror 18 to primary mirror 12 is preferably equal to the square of the golden ratio, or about 2.6, to minimize low order aberrations as described above.

Incident energy radiating from the field of view, indicated generally by arrow 22, is reflected by primary mirror 12 to secondary mirror 18 and then through aperture 24 which extends through primary mirror 12. In one embodiment of the present invention, incident energy is in the form of visible light. At least a portion of the energy or light reflected from secondary mirror 18 passes through field stop 26 and impinges upon at least one detector 28. The field or aperture stop 26 is preferably concentric with the symmetry axis of system 10. Because the light enters field stop 26 at an oblique angle, the resolution in the tangential direction is lower than in the sagittal direction. The depth of field and effective aperture of system 10 may be controlled by placing an iris at the stop position such that the transmission of light therethrough may be selectively controlled.

In a preferred embodiment, detector 28 includes an optical element 30 having a generally spherical surface 32 with a radius of curvature $R_3$ measured from center point 14 to surface 32. Optical element 30 includes a generally parallel surface 34 which is coupled to a photodetector 36, such as a charge coupled device (CCD) array, and opposite the generally spherical surface 32. Optical element 30 is preferably a fiberoptic faceplate having a plurality of fibers 33 of varying lengths arranged such that the first ends are substantially coplanar and second ends define a generally convex annular spherical surface, although conventional lenses could also be utilized to perform the same function. However, use of conventional lenses results in a more complicated (and likely more expensive) system with generally lower resolution. Optical element 30 is necessary to correct for the considerable amount of field curvature in the image created by system 10. The construction of element 30, having curved surface 32 opposite planar surface 34, transfers or transforms the curved focal plane of the system to the flat surface of photodetector 36 which generates electrical signals in response to the incident energy.

Preferably, detector 28 communicates with a computer 38 capable of storing information representative of the image incident on photodetector 36. It would also be possible for computer 38 to control an iris used within or in place of field stop 26. In addition, computer 38 may control focussing of an image on detector 28 by controlling translation of each such detector independently of the others with the condition that adjacent edges of optical element 30 be at nearly the same focal plane to avoid abrupt transitions across seams. Of course a fixed focus system without this capability would also be possible and would likely be significantly less expensive.

Computer 38 may perform various digital image processing using signals generated by the one or more detectors and store raw data or processed data representing the captured image for later use. Processing by computer 38 may be performed in hardware, software, or a combination of both. For example, computer 38 could be used to digitally correct an image captured by one or more photodetectors to perform digital focussing or correct for the field curvature provided suitable detectors are available. This may reduce or eliminate the need for devices such as optical element 30.

Figure 2:
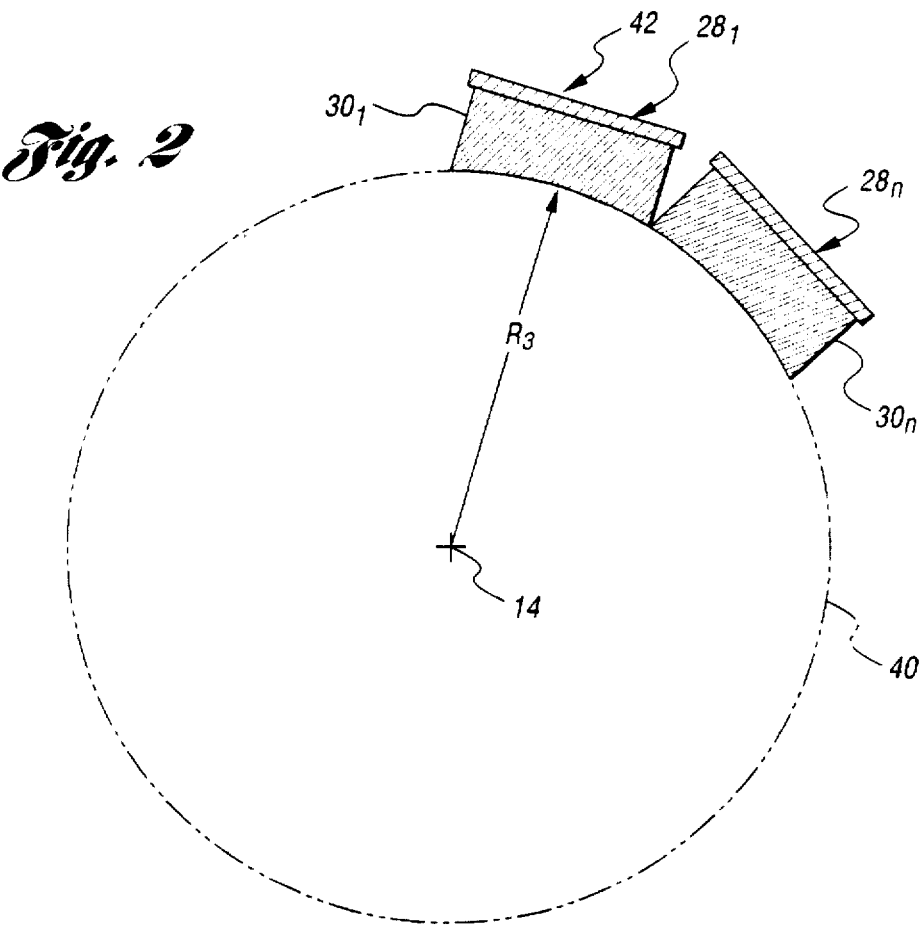
FIG. 2 is a top view of a detector which corrects field curvature for use in a system for imaging according to the present invention.

Referring now to FIG. 2, a sectional view of a detector array, taken along line 2—2 of detector 28 in FIG. 1, for use with a system and method for imaging a wide angle field of view according to the present invention is shown. In section, focal plane 40 is generally circular because the actual focal plane is generally spherical as illustrated in FIG. 1. Detector array 42 includes a plurality of detectors (only two of which are shown), represented by detector $28_i$ through detector $28_n$. Detectors $28_i$ through $28_n$ are preferably juxtaposed such that their corresponding optical elements $30_i$ through $30_n$ contact their adjacent elements. The seam created by this juxtapositioning is likely only a few pixels wide and can be corrected or filtered by the image processing software or hardware.

In an alternative embodiment, one or more detectors may be eliminated while the remaining detectors are rotated or rotationally oscillated about center point 14 to image an entire 360 degree field of view. This arrangement eliminates seams or overlaps in the image and reduces system cost by eliminating detectors. However, the light gathering capability of the system may be significantly lower because the charge integration time for each pixel is reduced.

Figure 3:
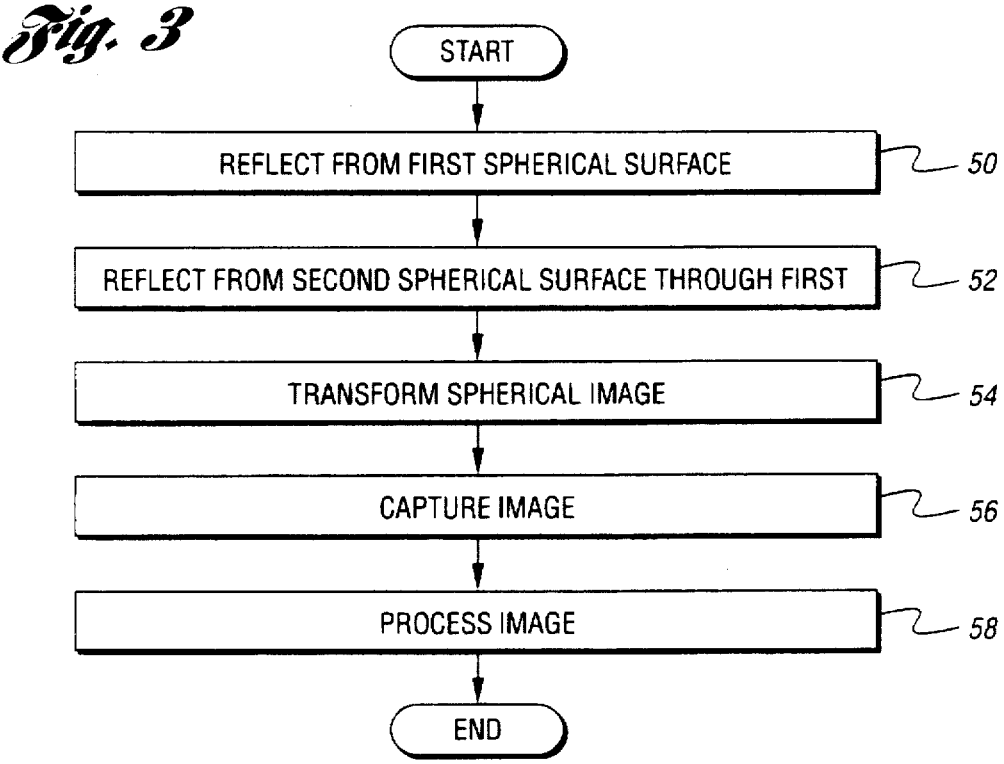
FIG. 3 is a flow chart illustrating a method for imaging a wide angle field of view according to the present invention.

Referring now to FIG. 3, a flow chart illustrating a method for imaging a wide field of view according to the present invention is shown. As will be appreciated by one of ordinary skill in the art, although the illustration depicts a sequential process, one or more steps may be performed simultaneously or the order of steps may be interchanged without departing from the spirit or scope of the present invention. Light energy radiating from the field of view is reflected from a first generally spherical surface as represented by block 50. Preferably, the first spherical surface is a convex surface such that incident parallel light rays diverge upon reflection from the surface. A second concentrically positioned spherical surface reflects light reflected from the first surface as represented by block 52. The second spherical surface is preferably convex so that incident parallel light rays converge when reflected. As indicated in block 52, the second step includes reflecting light from the second spherical surface through an aperture in the first spherical surface.

With continuing reference to FIG. 3, a spherical image which is formed after reflection from the second spherical surface is transformed as represented by block 54. This step may include a physical transformation of the image such as may be accomplished by an optical element or series of elements such as a lens system or a fiber optic faceplate. Alternatively, block 54 may be omitted and the transformation may be performed computationally as represented by block 58 after capturing the image as represented by block 56. Preferably, the transformation corrects for field curvature so as to transform the spherical image to a planar image.

Capturing the image as represented by block 56 may include creating a digital representation of the image and storing the representation for subsequent processing and retrieval. Processing the image as represented by block 58 may include any of a number of image processing steps depending upon the application. Image processing may include digital focussing, filtering, and the like.

It is understood, of course, that while the forms of the invention herein shown and described constitute the best mode contemplated for carrying out the invention, they are not intended to illustrate all possible forms thereof. It will also be understood that the words used are descriptive rather than limiting, and that various changes may be made without departing from the spirit or scope of the invention as defined by the following claims.

What is claimed is:

1. A system for imaging a wide angle field of view, the system comprising:
    an annular spheroid having a convex surface for reflecting incident energy radiating from the field of view, the annular spheroid having an axially extending aperture, an associated center point, and a first radius extending from the center point to the convex surface;
    a second spheroid having a concave surface for reflecting energy propagating from the annular spheroid toward the center point, the second spheroid positioned concentrically relative to the annular spheroid and having a second radius extending from the center point to the concave surface; and
    at least one detector positioned to receive at least a portion of the energy reflected from the second spheroid, the detector including a fiber optic faceplate having a plurality of fibers with first and second ends and varying lengths, the plurality arranged such that the first ends are substantially coplanar and the second ends define a generally convex spheroidal surface.

* * * * *